United States Patent [19]
Jacobs et al.

[11] Patent Number: 6,126,534
[45] Date of Patent: Oct. 3, 2000

[54] METHOD AND APPARATUS FOR ANAESTHETIZING ANIMALS FOR SLAUGHTER WITH GAS

[75] Inventors: Thomas Gerardus Maria Jacobs, Hoog Keppel; Sander Antonie Van Ochten, Lichtenvoorde; Adrianus Josephus Van Den Nieuwelaar, Gemart; Jenneke Antonia Christina Lankhaar, Bokhoven, all of Netherlands

[73] Assignee: Stork MPS B.V., Lichtenvoorde, Netherlands

[21] Appl. No.: 09/331,368

[22] PCT Filed: Dec. 16, 1997

[86] PCT No.: PCT/NL97/00701

§ 371 Date: Sep. 10, 1999

§ 102(e) Date: Sep. 10, 1999

[87] PCT Pub. No.: WO98/27821

PCT Pub. Date: Jul. 2, 1998

[30] Foreign Application Priority Data

Dec. 20, 1996 [NL] Netherlands .......................... 1004847
Jul. 3, 1997 [NL] Netherlands .......................... 1006466

[51] Int. Cl.[7] ..................................................... A22B 3/00
[52] U.S. Cl. ............................................................. 452/66
[58] Field of Search ................................................. 452/66

[56] References Cited

U.S. PATENT DOCUMENTS

| 2,526,037 | 10/1950 | Murphy . | |
|---|---|---|---|
| 2,733,477 | 2/1956 | Murphy | 452/66 |
| 5,186,677 | 2/1993 | Christensen et al. | 452/66 |
| 5,220,882 | 6/1993 | Jenkins . | |
| 5,435,776 | 7/1995 | Owen et al. | 452/66 |
| 5,487,699 | 1/1996 | Tyrrell et al. | 452/66 |
| 5,788,564 | 8/1998 | Chamberlain | 452/66 |

FOREIGN PATENT DOCUMENTS

| 898816 | 5/1984 | Belgium . |
|---|---|---|
| 9415469 | 7/1994 | WIPO . |

*Primary Examiner*—Willis Little
*Attorney, Agent, or Firm*—Webb Ziesenheim Logsdon Orkin & Hanson, P.C.

[57] ABSTRACT

A method for anaesthetizing animals for slaughter is provided using gas by transporting the animals for anaesthetizing through a gas-filled anaesthetizing space. The gas is introduced into the anaesthetizing space by a gas feed and gas is drawn out of the anaesthetizing space at a distance from the gas feed by a gas discharge. An apparatus for anaesthetizing livestock for slaughter using gas is provided with an anaesthetizing space having a supply opening and a discharge opening for gas.

35 Claims, 2 Drawing Sheets

METHOD AND APPARATUS FOR ANAESTHETIZING ANIMALS FOR SLAUGHTER WITH GAS

BACKGROUND OF THE INVENTION

The invention relates to an improved method and apparatus for anaesthetizing animals for slaughter using gas by transporting the animals for anaesthetizing trough a gas-filled anaesthetizing space.

It is usual to anaesthetize animals prior to slaughter. Anaesthetizing can take place for instance by means of electric shock of using an anaesthetizing gas. It is known to suffocate animals using $CO_2$ in a tunnel, bath or lower-lying space (the specific mass of $CO_2$ is greater than the specific mass of air). The transition area from normal atmospheric conditions to the conditioned anaesthetizing environment is relatively long. This means that the anaesthetizing process begins gradually. A drawback here is that the anaesthetizing process takes a relatively long time, with a larger space thus being required. The animals for slaughter moreover become excited during the initial progress, which has an adverse effect on the final quality of the meat and results in a not very animal-friendly slaughtering process.

The present invention has for its object to provide an apparatus and method with which animals for slaughter can be anaesthetized quickly using gas, wherein the animals become less excited, thus resulting in a better meat quality.

Another advantage of a controlled gas composition in the anaesthetizing of animals for slaughter is that the biochemical process which occurs in the animals is better controlled, which results in a better control and even influencing of the meat quality of the slaughtered animals.

The present invention provides for this purpose a method according to claim 1.

WO-A-94/15469 discloses a method for anaesthetizing animals for slaughter using gas by transporting the animals for anaesthetizing through two adjacent gas-filled anaesthetizing chambers separated by a partition. This partition may be for e.g. a strip curtain, an air curtain, a water curtain or a moving screen. The purpose of the partition is to separate the gas atmospheres in the respective chambers. In each of the chambers a specific gas is introduced through a respective gas feed. Optionally, part of the gas in its first chamber is removed by means of a pipe debouching in the first chamber for recirculating the gas thus removed from the first chamber for recirculation after mixing with the gas fed to the second chamber. This prior art arrangement does not allow a simple yet effective control of the respective gas atmospheres in the two chambers.

SUMMARY OF THE INVENTION

The gas discharged from the anaesthetizing space in accordance with the invention is preferably fed back into the space by the gas feed. Even more preferably, a gas is herein added to the discharged gas for feeding back again for the purpose of conditioning the gas for feeding. The forced gas feed and gas discharge enables the creation of a relatively abrupt transition from atmospheric conditions to conditioned anaesthetizing conditions. Such an abrupt transition has the result that the anaesthetizing process will also begin abruptly, which shortens the total anaesthetizing process. This results in less stress in the animals for slaughter and thereby an improved meat quality in addition to a more animal-friendly anaesthetizing. In order to limit the gas consumption it is advisable to re-use the gas discharged from the anaesthetizing space by feeding it back again into the anaesthetizing space. In practice the discharged gas will have a composition other than the optimal gas composition of the gas for feeding. Compared with the supplied gas, the discharged gas will be mixed with ambient air and gases given off by the animals. In order to control the quality of the anaesthetizing process when the discharged gas is re-used, gas is preferably added to the discharged gas before it is fed back again into the anaesthetizing space.

A gas flow generated by the gas feed and gas discharge is preferably transported through the anaesthetizing space at a speed such that the gas composition in the anaesthetizing space is substantially homogeneous. Even more preferably, the flow speed of the gas flow in the anaesthetizing space is at least a factor of two greater than the speed at which the animals are carried through the anaesthetizing space. Because the gas fed into the anaesthetizing space generally consists of a mixture and because this mixture can be mixed locally in the anaesthetizing space with other gases, such as for instance ambient air transported with the animals or gases given off by the animals, there is the danger of a non-homogeneous gas composition in the anaesthetizing space. By now causing the gas flow in the anaesthetizing space to take place at sufficient high speed the gas composition will remain substantially homogeneous, thus enabling quality control of the anaesthetizing process. It is found in practice that when the gas flow in the anaesthetizing space is at least a factor of two greater than the transporting speed of the animals, the desired homogeneity of the gas in the anaesthetizing space can be obtained at usual animal transporting speeds.

The direction of the gas flow is preferably opposed to the transporting direction of the animals for slaughter through the anaesthetizing space. In this manner it is possible to prevent the air being carried along with the gas flow with the animals for slaughter into the anaesthetizing space. Due to the flow direction of the gas being opposed to the transporting direction of the livestock, this ambient air will be unable to enter the anaesthetizing space, or will only do so over very limited distance, in the vicinity of the supply opening for the animals for slaughter. Regulation of the gas composition in the anaesthetizing space is also comparatively simple using the counterflow principle. Finally, sufficiently great relative difference in speed can be realized in comparatively simple manner between the gas flow and the transported livestock.

It is noted that the gas flow may also have the same direction as the transporting direction of the livestock.

For an automatic quality control of the gas in the anaesthetizing space, the quality of the discharged gas, gas for supplying or supplied gas is preferably measured and the volume of the gas for adding is determined subject to the measured gas composition. Influencing of the quality and/or the volume of gas for adding can thus take place feedback or feedforward, and there is herein a preference for a feedforward control because such a system can in principle make adjustments without delay.

Gas is preferably supplied from a gas buffer into the anaesthetizing space and gas drawn off from the anaesthetizing space is fed into the gas buffer. The volume of the gas buffer captures at least half the total system volume. Even more preferably, the buffer forms at least 60% of the total system volume in which the buffer is incorporated. The gas buffer makes an anaesthetizing system more stable in use, i.e. contaminating gas flows have only a limited influence on the desired gas concentrations. By these contaminating gas flows must be understood outside air carried into the system with the animals for slaughter, air exhaled by the animals for anaesthetizing etc.

The angle at which the gas is fed into the anaesthetizing space is preferably adjustable. Even more preferably, the angle is adjusted such that the gas pressure on the side of the gas feed remote from the gas discharge is such that no outside air is drawn in. By thus supplying gas it is possible, using for instance a limited gas overpressure, to prevent for instance outside air being drawn into the anaesthetizing system. These various aspects result in a better controlled gas quality in the anaesthetizing system and consequently to an improved control of the anaesthetizing process.

In another preferred method the anaesthetizing space is divided into at least two segments, through which segments the livestock is successively transported, and gas is supplied and discharged separately to and from each segment. An independent gas circulation is preferably realized in the separate segments. Herein the quality of the gases in the successive segments of the anaesthetizing space can differ mutually, wherein the first segment to be passed through can contain a gas with an excess of oxygen. The second segment to be passed through preferably contains 5–15% by volume of oxygen. By anaesthetizing the livestock in at least two stages it is possible first of all to lightly anaesthetize the livestock rapidly and without convulsions, and thus without stress, and then to convert this light anaesthesia into a deep anaesthesia. A rapid and less deep anaesthesia can for instance by realized by mixing an anaesthetizing gas with an excess of oxygen, i.e. a larger concentration of oxygen than in the atmosphere. In order to suffocate the livestock in the second segment an oxygen volume of 5–15% is required therein. During both a first stage anaesthetizing and a second stage of the anaesthetizing an excess of $CO_2$ is present in the anaesthetizing space, i.e. for instance a $CO_2$ content of 60–90% by volume. Such an excess of $CO_2$ results in the desired suffocation without adversely affecting the meat quality.

The supply angle of the gas into the second segment to be passed through is preferably such that the gas pressure on the side of the gas feed remote from the gas discharge substantially corresponds with the gas pressure outside the anaesthetizing space. Not only is outside air thus prevented from being drawn into the second segment, but anaesthetizing gas is also prevented from being blown into the ambient air, which would make the method unnecessarily costly. Another advantage of not blowing anaesthetizing air into the ambient air is that there is less risk for operative personnel.

The supply angle of the gas into the first segment to be passed through is preferably such that the gas pressure on the side of the gas feed remote from the gas discharge is lower than the gas pressure in a space between the first and second segment to be passed through. Gas from the intermediate space will hereby be drawn into the first segment to be passed through. "Overflow" gases from the second segment to be passed through will thus not disappear into the environment at the end thereof but are drawn into the first anaesthetizing segment to be passed through and are therefore not lost. The "overflow" gases from the second segment are in any case usefully employed in the first anaesthetizing segment to be passed through.

In yet another preferred embodiment of the method water vapour is supplied to the anaesthetizing space. In order to prevent the livestock developing a dry throat in the anaesthetizing space, which results in stress, water vapour can be supplied to the anaesthetizing space. This step also contributes to an animal-friendly anaesthetizing with little stress, which also results in an improved meat quality.

The invention also relates to an apparatus for anaesthetizing animals for slaughter which uses gas as described in claim 21.

The relevant contents of WO-A-94/15469 have already been discussed with reference to the method according to the invention specified in independent claim 1. It is important to known that in accord with the invention a gas flow is established between the gas feed and the gas discharge, which flow is controllable and continuous and the flow is parallel to the transport direction between the gas feed and the gas discharge.

The gas supply is in accord with the invention preferably connected to a gas discharge by means of a circulation system. The apparatus preferably also comprises a measuring device for measuring the gas quality. The advantages of this apparatus and preferred embodiments thereof have already been discussed above. The advantage of including a gas buffer in the circulation system has also already been discussed above.

In preference the anaesthetizing space is substantially tunnel-shaped. A tunnel-shaped space has the significant advantage that relatively little gas can be present in the anaesthetizing space. A controllable gas flow can moreover be realized in simple manner. This is particularly the case when the cross-section of the tunnel-shaped space is adapted to the dimensions of the animals for anaesthetizing.

By coupling the measuring device to the gas supply means for automatic regulation of the quality of the gas for feeding, an automatic guarantee of the gas quality in the anaesthetizing space can be realized without any labour being required for this purpose.

The preferred embodiment of the apparatus wherein at least two co-acting gas supply and gas discharge combinations are placed in the anaesthetizing space at successive positions along the conveyor in order to realize two successive segments in the anaesthetizing space each having a separate gas regulation, makes is possible to divide the anaesthetizing process into a number of parts. The advantages of phased anaesthetizing have likewise already been discussed above.

Preferably incorporated in the feed opening are guiding means for adjusting the angle at which the gas is carried into the anaesthetizing space. The adjustable inflow angle of the gas into the anaesthetizing space has the advantage that the gas pressure can be controlled close to the gas feed opening. As already discussed above, a gas pressure may be desired which is greater, smaller or equal to the ambient air pressure. This can be realized using the guiding means.

The anaesthetizing space is preferably bounded on the supply side or discharge side by at least one screen assembled from vertical strip parts. The successive segments of the anaesthetizing space can preferably also be separated by at least one screen assembled from vertical strip parts. Such a screen has the advantage that gas remnants present in the fur or feathers of the animals for anaesthetizing are at least partially displaced by the strips which exert a pressure on the animals for anaesthetizing. Due to the relative speed between the animals for anaesthetizing and the atmosphere surrounding them, these gas remnants will be rapidly removed from either the fur or feathers. It has also been found that this results in a calming effect on the animals for anaesthetizing. Less contaminated gas will thus be carried into the anaesthetizing system. Another advantage of the strip screens is that poultry in particular calms down when carried through such a screen.

As well as with the above specified screens, boundaries can, if desired, also be realized in other ways, for instance with an air screen or otherwise with gas flow profiles or a partition wall with an opening or with swing doors.

When the apparatus comprises successive anaesthetizing segments, these latter are preferably mutually connected by an intermediate space. The individual process steps are thus clearly separated from each other, thus enhancing the ability to control the two separate processes. The intermediate space also functions as a sluice between the separate treatment steps, whereby the gas circulation systems in the individual segments are separated from each other better. This reduces mixing of gases from the individual segments.

Depending on the animals for slaughter, the conveyor can be adapted for poultry transport or for transport of large livestock. The described method and apparatus can be used both for slaughtering poultry such as for instance chickens and for slaughtering large livestock such as for instance pigs and cattle. It will be apparent that the dimensions of the apparatus depend on the animals to be slaughtered. In a preferred embodiment the conveyor consists of an endless supporting conveyor on which supporting elements are fixed for engaging the breast and/or belly of the animals for slaughter such that the legs hang downward along the conveyor. Such a conveyor is particularly suitable for large livestock and has the important advantage that the large livestock remains relatively calm during transport over this conveyor before being carried into the anaesthetizing space. Another important advantage of this conveyor is that the surface area of a cross-section through the conveyor with the livestock lying thereon is relatively limited. This provides the option of applying a tunnel construction with a relatively limited passage, whereby higher flow speeds can be obtained in simple manner.

BRIEF DESCRIPTION OF THE DRAWINGS

The present invention will be further elucidated with reference to the non-limitative embodiments shown in the following figures. Herein.

DESCRIPTION OF THE PREFERRED EMBODIMENTS

Figure 1:
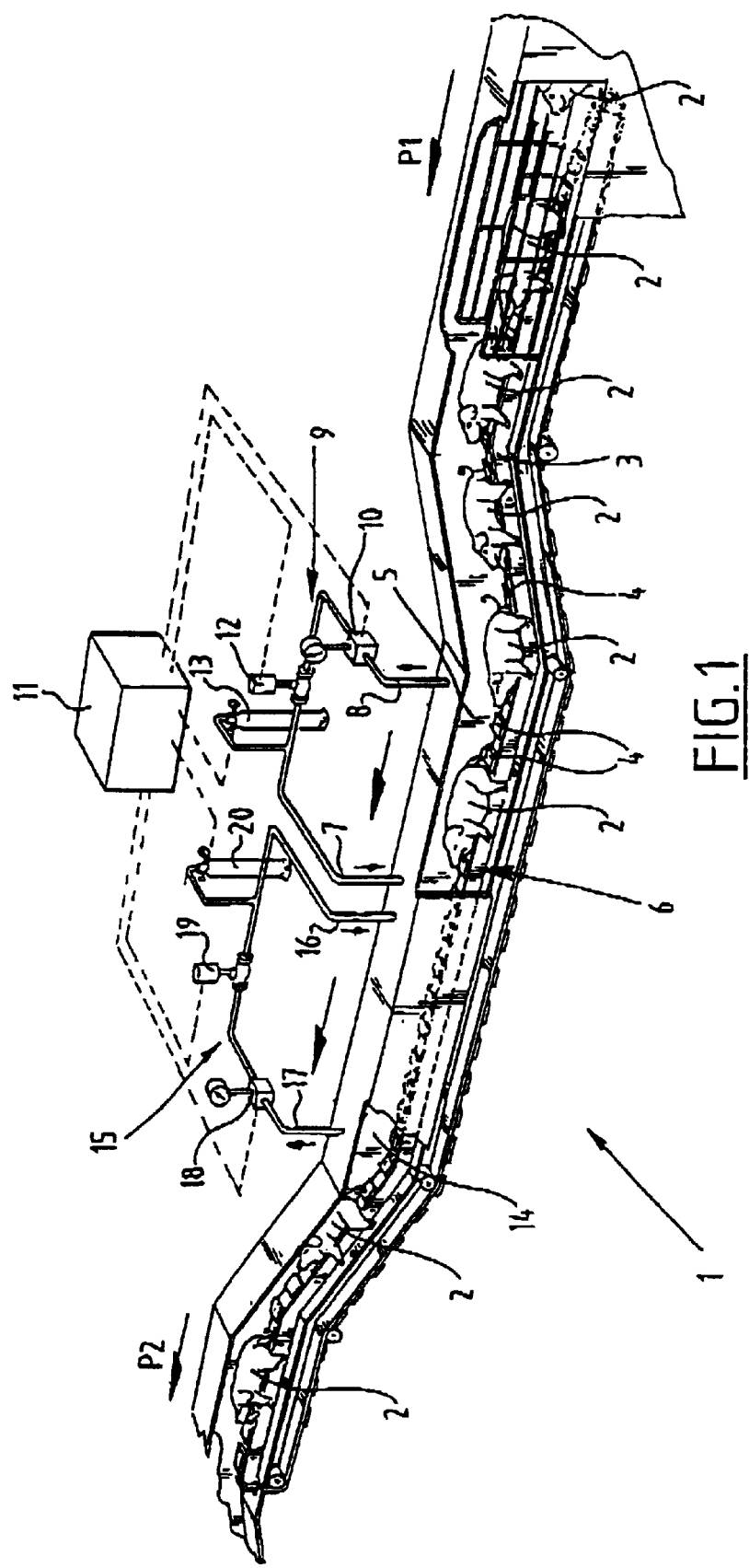
FIG. 1 shows a partly cut-away three-dimensional view of an anaesthetizing apparatus according to the invention.

FIG. 1 shows an apparatus 1 in which pigs 2 are supplied as according to an arrow P1 and placed on an endless supporting conveyor 3. Endless conveyor 3 contains for this purpose supporting elements 4 which are located on the outside thereof and which are adapted to engage the breast and/or belly of the pigs 2. Pigs 2 are carried over a downward sloping part of conveyor 3 into a first segment 5 of anaesthetizing space 6. In this first segment 5 gas is introduced by a gas feed 7 and gas is discharged by a gas discharge 8. Gas feed 7 and gas discharge 8 are mutually connected using a gas circulation system 9. In gas circulation system 9 includes a measuring device 10, the measured values of which are transmitted to a central control device 11, for instance a computer. Control device 11 then generates signals which are transmitted to a circulation pump 12 which is optionally provided with a controllable valve for allowing a gas flow to escape partially from the system as required. Control device 11 is also connected to a control valve of a gas bottle 13 with which a greater or smaller amount of conditioning gas can be fed to the discharged gas subject to the gas quality measured by measuring device 10. The thus conditioned gas passes again through gas feed 7 into the first segment 5 of anaesthetizing space 6. After passing through first segment 5 of anaesthetizing space 6 the lightly anaesthetizing pigs 2 are carried to a second segment 14 of anaesthetizing space 6. Connecting onto second segment 14 of anaesthetizing space 6 is a gas circulation system 15 which is very similar to the gas circulation system 9 which connects onto first segment 5 of anaesthetizing space 6. This gas circulation system 15 also comprises a gas feed 16 and a gas discharge 17, a measuring device 18, a circulation pump 19 and a gas bottle 20. The operation of gas circulation system 15 corresponds with the described operation of gas circulation system 9. It is however noted here that the position of gas feed 16 relative to gas discharge 17 in the transporting direction of endless conveyor 3 is precisely the opposite of the arrangement of gas feed 7 relative to gas discharge 8 of the first gas circulation system. This results in the anaesthetizing gas being in counterflow to the transporting direction of conveyor 2 in the first segment of gas anaesthetizing space 6, while in the second segment 14 the gas flow of the anaesthetizing gas is in the same direction as the transporting direction of conveyor 2.

After leaving the second segment 14 of the anaesthetizing space, the now deeply anaesthetized pigs 2 are carried upward via an upward rising part and transported as according to an arrow P2 to a following processing.

Figure 2:
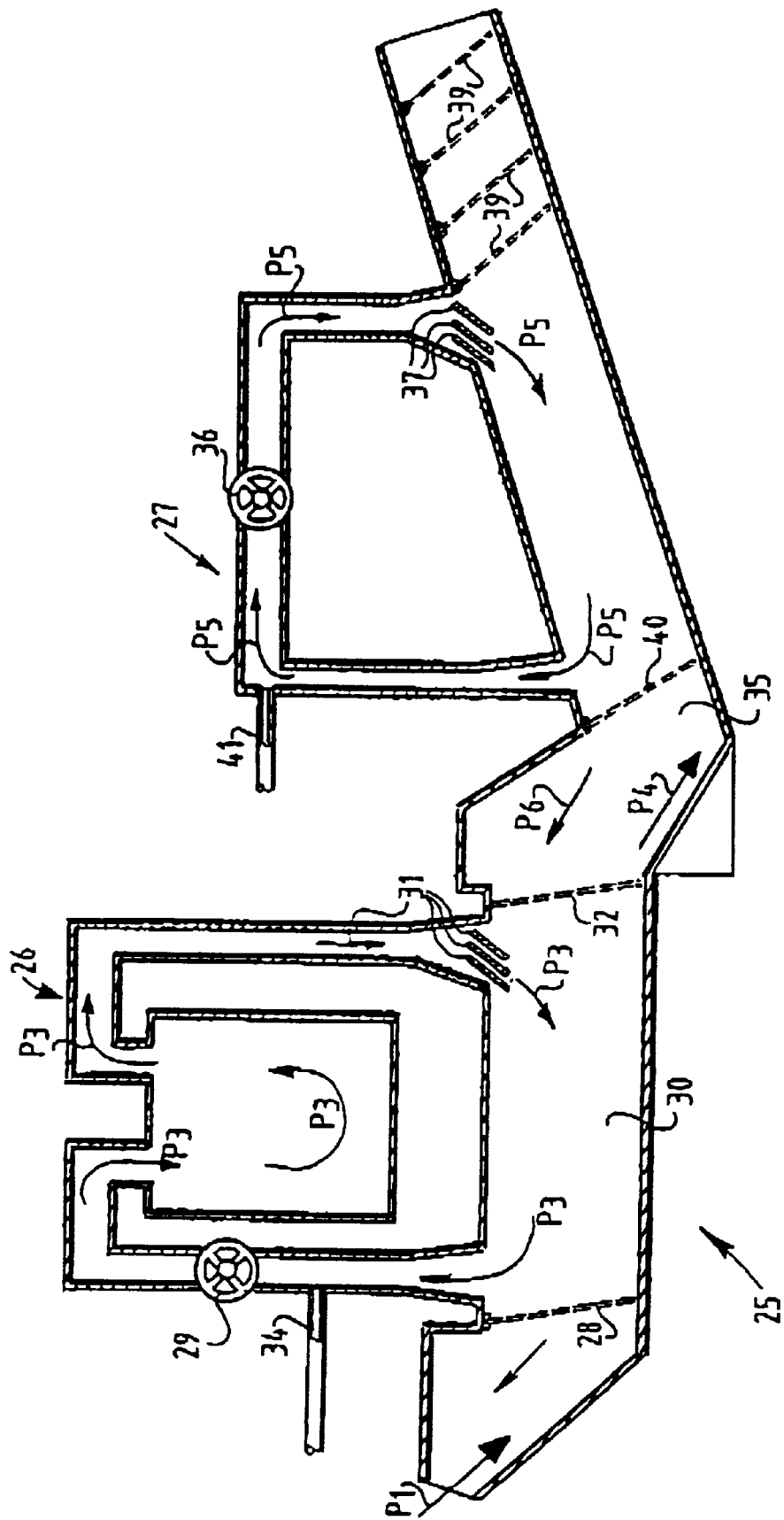
FIG. 2 shows a schematic cross-section through a variant of the anaesthetizing apparatus shown in FIG. 1.

FIG. 2 shows a schematic cross-section through an anaesthetizing apparatus 25 with two successive segments 26, 27. The animals for slaughter are supplied as according to arrow P1. The transporting means for animal transport are not shown in this apparatus 25. The first segment 26 to be passed through is separated from the outside world by a strip curtain 28. A pump 29 provides gas circulation in the first segment 26 to be passed through as according to arrows P3. The gas is blown into the anaesthetizing space 30 in a manner such that it is blown in at the desired angle using guiding means 31. This is particularly desirable in order to control the gas pressure below and at an angle behind guiding means 31 such as baffles or louvers. The first segment 26 to be passed through is separated from the environment on the side where the animals leave this segment 26 again by a strip curtain 32. A buffer space 33 incorporated in the circulation system is provided for stabilization of the gas quality in the first segment 26 to be passed through. This latter is further provided with a gas supply 34 through which determined gas components can be supplied as required to the circulation system 26. The anaesthetized animals leave the first segment 26 to be passed through as according to arrow P4 whereby they arrive in an intermediate space 35. This intermediate space 35 also functions as sluice.

The second segment 27 of anaesthetizing apparatus 25 to be passed through consists once again of a gas circulation system. A pump 36 provides gas flow as according to arrows P5. Guiding means 37 are also arranged in the second segment 27 to be passed through for controlling the blow-in direction of gas into the second anaesthetizing space 38. In order to prevent direct leakage into the environment of anaesthetizing gases from the second segment to be passed through, this segment 27 is separated from the environment by a plurality of successively placed strip curtains 39. A strip curtain 40 is also placed strip curtains 39. A strip curtain 40 is also arranged on the feed side of anaesthetizing space 38.

"Overflow gases" from the second segment to be passed through preferably flow as according to arrow P6 from the second segment 27 to be passed through to the first segment 26 to be passed through. This flow direction P6 of overflow gases out of the second segment 27 to be passed through is obtained inter alia by the greater number of strip curtains 39 which adjoin the outer end of the second segment 27 to be passed through, but also by means of the guiding means 31 and 37 with which gas pressures can be regulated at determined positions in the system. A relatively low gas pressure is thus applied in particular below and behind the guiding means 31 of the first segment 26 to be passed through, while below and behind the guiding means 37 of the second segment 27 to be passed through a gas pressure is created which is practically the same as the ambient pressure.

It will be apparent that the second segment 27 to be passed through can also be provided with a buffer space 33 as is present in the first segment 26 to be passed through. Finally, it is noted that the second segment 27 to be passed through is also provided with a gas supply 41 for supply of desired gas components.

What is claimed is:

1. A method for anaesthetizing animals for slaughter using gas, comprising the steps of:
   transporting the animals for anaesthetizing through a gas-filled anaesthetizing space;
   introducing gas into the anaesthetizing space by a gas feed;
   drawing gas out of the anaesthetizing space by a gas discharge spaced from the gas feed with respect to a transporting direction of the animals such that a controllable and substantially continuous gas flow substantially parallel to the transporting direction is established between the gas feed and the gas discharge.

2. The method as claimed in claim 1, wherein the gas discharged from the anaesthetizing space is fed back into the space by the gas feed.

3. The method as claimed in claim 2, wherein additional gas is added to the discharged gas which is then fed back into the anaesthetizing space.

4. The method as claimed in claim 1, wherein a gas flow generated by the gas feed and gas discharge is transported through the anaesthetizing space at a speed such that a gas composition in the anaesthetizing space is substantially homogeneous.

5. The method as claimed in claim 4, wherein a flow speed of the gas flow in the anaesthetizing space is at least a factor of two greater than the speed at which the animals are carried through the anaesthetizing space.

6. The method as claimed in claim 1, wherein the gas flow has substantially the same direction as the transporting direction of the animals.

7. The method as claimed in claim 1, wherein the direction of the gas flow is opposed to the transporting direction of the animals for slaughter through the anaesthetizing space.

8. The method as claimed in claim 1, wherein a quality of the discharged gas, gas for supplying or supplied gas is measured and at least one of the quality and the volume of the gas for adding is determined subject to the measured gas composition.

9. The method as claimed in claim 1, wherein gas is supplied from a gas buffer into the anaesthetizing space and gas drawn out of the anaesthetizing space is fed into the gas buffer.

10. The method as claimed in claim 1, wherein an angle at which the gas is fed into the anaesthetizing space is adjustable.

11. The method as claimed in claim 1, wherein an angle at which the gas is fed into the anaesthetizing space is adjusted such that substantially no outside air is drawn in.

12. The method as claimed in claim 1, wherein the anaesthetizing space is divided into at least two segments, through which segments the animals are successively transported and gas is supplied and discharged separately to and from each segment.

13. The method as claimed in claim 12, wherein an independent gas circulation is provided in each of the separate segments.

14. The method as claimed in claim 12, wherein a composition of the gases in the successive segments of the anaesthetizing space differ.

15. The method as claimed in claim 12, wherein a first segment to be passed through contains a gas with a greater oxygen content than the ambient atmosphere.

16. The method as claimed in claim 12, wherein a second segment to be passed through contains a gas with 5–15% by volume of oxygen.

17. The method as claimed in claim 12, wherein at least one of a first and a second segment to be passed through contains a greater $CO_2$ content than the ambient atmosphere.

18. The method as claimed in claim 12, wherein a supply angle of the gas into a second segment to be passed through is such that a gas pressure on a side of the gas feed remote from the gas discharge substantially corresponds with a gas pressure outside the anaesthetizing space.

19. The method as claimed in claim 12, wherein a supply angle of the gas into a first segment to be passed through is such that a gas pressure on a side of the gas feed remote from the gas discharge is lower than a gas pressure in a space between the first and a second segment to be pass through.

20. The method as claimed in claim 1, wherein water vapour is supplied to the anaesthetizing space.

21. An apparatus for anaesthetizing animals for slaughter, said apparatus comprising:
   an anaesthetizing space provided with an inlet opening and an outlet opening for the animals for slaughter;
   a conveyor movable in a transporting direction through the anaesthetizing space for forced movement of the animals for slaughter through the anaesthetizing space;
   a gas feed connectable to a gas supply and a gas discharge debouching in said anaesthetizing space, said gas discharge spaced from said gas feed with respect to a conveying direction of the animals such that a controllable and substantially continuous gas flow is established substantially parallel to the transporting direction between said gas feed and said gas discharge.

22. The apparatus as claimed in claim 21, wherein the gas supply is connected to the gas discharge by a circulation system.

23. The apparatus as claimed in claim 22, wherein a gas buffer is incorporated in the circulation system.

24. The apparatus as claimed in claim 21, comprising a measuring device for measuring gas composition.

25. The apparatus as claimed in claim 24, wherein the measuring device is coupled to the gas supply for automatic regulation of a quality of the gas for feeding into the anaesthetizing space.

26. The apparatus as claimed in claim 21, wherein the anaesthetizing space is substantially tunnel-shaped.

27. The apparatus as claimed in claim 21, wherein at least two co-acting gas supply and gas discharge assemblies are located in the anaesthetizing space at successive segments in the anaesthetizing space, each segment having separate gas regulation.

28. The apparatus as claimed in claim 21, wherein a guiding device is incorporated in a feed opening for adjusting an angle at which the gas is directed into the anaesthetizing space.

29. The apparatus as claimed in claim 21, wherein the anaesthetizing space is bounded on a supply side or discharge side by at least one screen assembled from vertical strip parts.

30. The apparatus as claimed in claim 27, wherein the successive segments of the anaesthetizing space are separated by at least one screen assembled from vertical strip parts.

31. The apparatus as claimed in claim 27, wherein the successive segments are mutually connected by an intermediate space.

32. The apparatus as claimed in claim 21, wherein the conveyor is adapted for poultry transport.

33. The apparatus as claimed in claim 21, wherein the conveyor is adapted for transport of large animals.

34. The apparatus as claimed in claim 21, wherein the conveyor is an endless supporting conveyor on which supporting elements are fixed for engaging at least one of a breast or belly of the animals for slaughter such that the legs of the animal hang downwardly with respect to the conveyor.

35. The method as claimed in claim 17, wherein the $CO_2$ content in the gas is about 60–90% by volume $CO_2$.

* * * * *

UNITED STATES PATENT AND TRADEMARK OFFICE
CERTIFICATE OF CORRECTION

PATENT NO. : 6,126,534
DATED : October 3, 2000
INVENTOR(S) : Thomas G. M. Jacobs et al.

It is certified that error appears in the above-identified patent and that said Letters Patent is hereby corrected as shown below:

Column 1,
Line 9, "trough" should read -- through --.
Line 13, "of using" should read -- or using --.

Column 2,
Line 24, "sufficient" should read -- sufficiently --.

Column 3,
Line 27, "by realized" should read -- be realized --.

Column 6,
Lines 56-60, delete " A strip curtain 40 is also placed strip curtains 39."
(duplicate text)

Column 8, claim 27,
Line 57, after "at successive" insert -- positions along the conveyor in order to form two successive"--.

Signed and Sealed this

Eighteenth Day of September, 2001

Attest:

NICHOLAS P. GODICI
*Attesting Officer*   *Acting Director of the United States Patent and Trademark Office*